US011923182B2

(12) United States Patent
Zimmermann et al.

(10) Patent No.: US 11,923,182 B2
(45) Date of Patent: Mar. 5, 2024

(54) SUBSTANTIALLY SIMULTANEOUS RESONANCE-ENHANCED MULTIPHOTON AND LASER DESORPTION IONIZATION FOR SINGLE PARTICLE MASS SPECTROSCOPY

(71) Applicants: Helmholtz Zentrum München Deutsches Forschungszentrum Für Gesundheit Und Umwelt (GMBH), Neuherberg (DE); Photonion GMBH, Schwerin (DE)

(72) Inventors: Ralf Zimmermann, Bergisch Gladbach (DE); Johannes Passig, Rostock (DE); Sven Ehlert, Gelbensande (DE)

(73) Assignee: Helmholtz Zentrum München Deutsches Forschungszentrum Für Gesundheit Und Umwelt (GMBH), Neuherberg (DE)

( * ) Notice: Subject to any disclaimer, the term of this patent is extended or adjusted under 35 U.S.C. 154(b) by 0 days.

(21) Appl. No.: 17/053,506

(22) PCT Filed: Apr. 8, 2019

(86) PCT No.: PCT/EP2019/058780
§ 371 (c)(1),
(2) Date: Nov. 6, 2020

(87) PCT Pub. No.: WO2019/214885
PCT Pub. Date: Nov. 14, 2019

(65) Prior Publication Data

US 2021/0134574 A1 May 6, 2021

(30) Foreign Application Priority Data

May 9, 2018 (EP) .................................... 18171596

(51) Int. Cl.
*H01J 49/00* (2006.01)
*H01J 49/02* (2006.01)
(Continued)

(52) U.S. Cl.
CPC ...... *H01J 49/0463* (2013.01); *H01J 49/0031* (2013.01); *H01J 49/0095* (2013.01);
(Continued)

(58) Field of Classification Search
CPC .................................................. H01J 49/0463
See application file for complete search history.

(56) References Cited

U.S. PATENT DOCUMENTS 5,681,752 A 10/1997 Prather
2005/0035285 A1* 2/2005 Tan ...................... H01J 49/164 250/288

(Continued)

FOREIGN PATENT DOCUMENTS

CN 102176045 A 9/2011
CN 101592628 B * 10/2014

(Continued)

OTHER PUBLICATIONS

Bente, "Online Laser Desorption-Multiphoton Postionization Mass Spectrometry of Individual Aerosol Particles: Molecular Source Indicators for Particles Emitted from Different Traffic-Related and Wood Combustion Sources" Anal. Chem. 2008, 80, 8991-9004 (Year: 2008).*

(Continued)

*Primary Examiner* — Michael J Logie
(74) *Attorney, Agent, or Firm* — Dorsey & Whitney LLP

(57) ABSTRACT

Devices and methods for mass spectroscopic analysis of particles are disclosed herein. An example device includes: a first irradiation unit configured to irradiate a particle with electromagnetic radiation to cause components of the par-
(Continued)

ticle to detach from the particle. The example device further includes a second irradiation unit configured to irradiate substantially simultaneously i) at least a part of the detached components, and optionally a residual core of the particle, with a first beam of electromagnetic radiation the first beam of electromagnetic radiation exhibiting a first intensity, and ii) at least a part of the residual core, of the particle with a second beam of electromagnetic radiation. The second beam of electromagnetic radiation exhibiting a second intensity, which is preferably larger than the first intensity. The example device further includes a mass spectrometer comprising an ion source region, a first detection channel, and optionally a second detection channel.

16 Claims, 7 Drawing Sheets

(51) Int. Cl.
*H01J 49/04* (2006.01)
*H01J 49/16* (2006.01)

(52) U.S. Cl.
CPC .......... *H01J 49/025* (2013.01); *H01J 49/162* (2013.01); *H01J 49/164* (2013.01)

(56) References Cited

U.S. PATENT DOCUMENTS

| | | | | |
|---|---|---|---|---|
| 2007/0272849 A1* | 11/2007 | Kirihara | H01J 49/0422 | 250/288 |
| 2009/0250606 A1 | 10/2009 | Fergenson et al. | | |
| 2011/0071764 A1* | 3/2011 | Prather | H01J 49/40 | 250/281 |
| 2011/0121173 A1* | 5/2011 | Koenig | H01J 49/0463 | 250/282 |
| 2013/0118523 A1* | 5/2013 | Allison | H01J 49/164 | 134/1 |
| 2017/0140913 A1* | 5/2017 | Hitchcock | H01J 49/162 | |

FOREIGN PATENT DOCUMENTS

| | | | | |
|---|---|---|---|---|
| CN | 104471670 A | 3/2015 | | |
| EP | 1193497 A2 * | 4/2002 | G01N 30/72 | |
| EP | 1193497 A2 | 4/2002 | | |
| WO | 2009097064 | 8/2009 | | |

OTHER PUBLICATIONS

International Search Report and Written Opinion dated Jun. 21, 2019 for PCT/EP2019/058780.

Passig, et al., Aerosol Mass Spectrometer for Simultaneous Detection of Polyaromatic Hydrocarbons and Inorganic Components from Individual Particles, Analytical Chemistry, vol. 89 No. 12 ,Jun. 20, 2017 ,6341-6345.

A new single particle mass spectrometer: Multiple analysis of individual airborne aerosol particles for determination of polycyclic aromatic hydrocarbons and inorganic composition, Feb. 26-Mar. 1, 2018 PittCon Conference and Expo.

"DGMS—European Mass Spectrometry Conference", Program and Abstracts, Mar. 11-15, 2018.

"Pittcon Conference & Expo—Technical Program Agenda of Sessions Abstract PDF", Orlando, FL www.pittcon.org, Mar. 1, 2018.

Bente , et al., "An On-Line Aerosol Laser Mass Spectrometer with Three, Easily Interchangeable Laser Based Ionisation Methods for Characterisation of Inorganic and Aromatic Compounds on Particles", International Journal of Mass Spectrometry 258, 2006.

Bente , et al., "Online Laser Desorption-Multiphoton Postionization Mass Spectrometry of Individual Aerosol Particles: Molecular Source Indicators for Particles Emitted from Different Traffic-Related and Wood Combustion Sources", Analytical Chemistry, vol. 80 No. 23, Dec. 1, 2008.

Bente , et al., "Thermal Desorption-Multiphoton Ionization Time-of-Flight Mass Spectrometry of Individual Aerosol Particles: A Simplified Approach for Online Single-Particle Analysis of Polycyclic Aromatic Hydrocarbons and Their Derivatives", Anal. Chem. 81, 2009, 2525-2536.

Ferge , et al., "Fast Determination of the Relative Elemental and Organic Carbon Content of Aerosol Samples by On-Line Single-Particle Aerosol Time-of-Flight Mass Spectrometry", Environ. Sci. Technol. 40, 2006, 3327-3335.

Passig , et al., "Aerosol Mass Spectrometer for Simultaneous Detection of Polyaromatic Hydrocarbons and Inorganic Components from Individual Particles", Anal.Chem, 89, 2017, 6341-6345.

Passig , et al., "An New Single Particle Aerosol Laser Mass Spectrometer for Dual TOFMS Analysis of the Individual Airborne Aerosol Particles: Detection of Polycyclic Aromatic Hydrocarbons and Inorganic Compounds", European Mass Spectrometry Conference, Mar. 11-15, 2018.

Zimmermann , et al., "Application of Single-Particle Laser Desorption/Ionization Time-of-Flight Mass Spectrometry for Detection of Polycyclic Aromatic Hydrocarbons from Soot Particles Originating from an Industrial Combustion Process", Rapid Communication in Mass Spectrometry 17 Published online in Wiley Interscience (www.interscience.wiley.com) DOI: 10.1002/rcm.979, 2003, 851-859.

Johannes Passig, et al, "A new aerosol mass spectrometer for simultaneous detection of polyaromatic hydrocarbons and inorganic components from individual particles", Analytical Chemistry, vol. 89, No. 12, pp. 6342-6343, Jun. 20, 2017.

Office Action dated Dec. 13, 2023 issued in Chinese patent application No. 201980030202.1.

* cited by examiner

SUBSTANTIALLY SIMULTANEOUS RESONANCE-ENHANCED MULTIPHOTON AND LASER DESORPTION IONIZATION FOR SINGLE PARTICLE MASS SPECTROSCOPY

RELATED APPLICATIONS

This patent application is the U.S. National Stage filing under 35 U.S.C. 371 of PCT Patent Application No. PCT/EP2019/058780 entitled "DEVICE AND METHOD FOR MASS SPECTROSCOPIC ANALYSIS OF PARTICLES," filed Apr. 8, 2019, which claims priority to EP 18171596.2, filed May 9, 2018, each of which is incorporated herein by reference in its entirety.

The present invention relates to a device and a corresponding method for mass spectroscopic analysis of particles.

Online studies of single airborne particles represent a demanding challenge in aerosol chemistry. New technologies that help to unravel the role of ambient aerosols in earth climate and to assess local and specific health risks from air pollution are highly desired. Of particular relevance are polycyclic aromatic hydrocarbons (PAHs) and their derivatives in form of oxy- and nitro-PAHs from combustion processes being associated with both acute and long-term health effects. Also (transition-)metal containing particles (iron, vanadium, nickel lead etc.) are known do induce severe health effects. On-line measurements of these particle classes are often realized by single-particle mass spectrometry (SP-MS or Aerosol Time-of-Flight Mass Spectrometry, ATOF-MS), which also reveals the mixing state of the substances in the particle ensemble.

Usually, SP-MS apply laser desorption/ionization (LDI) in a mass spectrometer, revealing elemental constituents and limited molecular information by detection of both positive and negative ions. Approaches for the detection of PAHs from single particles have been developed but the elemental information from LDI that allows particle classification and source apportionment is lost in that case.

It is an objective of present invention to provide an enhanced device and method for mass spectroscopic analysis of particles, which in particular reveals enhanced information regarding the composition of individual particles.

The above objective is achieved by a device and method for mass spectroscopic analysis of particles according to the independent claims and/or aspects specified herein.

According a first aspect of the invention, a device for mass spectroscopic analysis of particles comprises: a first irradiation unit configured to irradiate a particle with electromagnetic radiation to cause components of the particle to detach, in particular to desorb, ablate and/or evaporate, from the particle, the detached components of the particle being located in proximity of a residual core of the particle, and a second irradiation unit configured to irradiate substantially simultaneously i) at least a part of the detached components, and optionally the residual core of the particle, with a first beam of electromagnetic radiation to cause an ionization of at least a part of the detached components, the first beam of electromagnetic radiation exhibiting a first intensity, and ii) at least a part of the residual core of the particle with a second beam of electromagnetic radiation to cause an ionization of at least a part of the components of the residual core of the particle, the second beam of electromagnetic radiation exhibiting a second intensity, which is preferably larger than the first intensity. The device further comprises a mass spectrometer comprising an ion source region configured to accommodate positive ions, and optionally negative ions, of the detached components and/or of the components of the residual core, a first detection channel configured to detect the positive ions, and optionally a second detection channel configured to detect the negative ions. Preferably, the first and second detection channel being arranged at opposing sides of the ion source region.

According to a second aspect of the invention, a method for mass spectroscopic analysis of particles comprises the following steps:

a) irradiating a particle with electromagnetic radiation to cause components of the particle to detach, in particular to desorb from the particle, the detached components of the particle being located in proximity of a residual core of the particle, b) irradiating substantially simultaneously i) at least a part of the detached components, and optionally the residual core of the particle, with a first beam of electromagnetic radiation to cause an ionization of at least a part of the detached components, the first beam of electromagnetic radiation exhibiting a first intensity, and ii) at least a part of the residual core of the particle with a second beam of electromagnetic radiation to cause an ionization of at least a part of the components of the residual core of the particle, the second beam of electromagnetic radiation exhibiting a second intensity, which is preferably larger than the first intensity, wherein positive ions, and optionally negative ions, of the detached components and/or of the components of the residual core are accommodated in an ion source region, and c) detecting the positive ions by a first detection channel, and optionally detecting the negative ions by a second detection channel. Preferably, the first and second detection channel being arranged at opposing sides of the ion source region.

The above aspects of the invention are based on the approach to cause components of a particle to detach from the particle, e.g. by means of laser desorption using infrared radiation or by ablation using different laser types including ultra-short pulses, and to subsequently ionize detached components of the particle and components of the residual particle core by irradiating at least a part of the cloud or plume of the detached components, and optionally also the residual particle core, with a first beam of radiation, preferably UV radiation, and at least a part of the residual particle core with a second beam of radiation, preferably UV radiation, having a preferably higher intensity than the first beam. Preferably, the intensity of the second beam is considerably, e.g. at least 2, 5, 10, 20, or 50 times, higher than the intensity of the first beam and/or the diameter of the first beam is considerably larger than the diameter of the second beam. For example, the first beam may be a parallel beam impinging on both the detached particles and the particle core, while the second beam may be a narrow, convergent and/or focused beam mainly impinging only on the particle core. Preferably, the irradiation of the detached components of the particle with the first beam of radiation and the irradiation of the residual particle core of same particle occurs simultaneously or substantially simultaneously. Thus, detached components of the particle and components of the residual particle core are being ionized simultaneously or substantially simultaneously. As a result, positive and/or negative ions of detached components of the particle and of components of the particle core are present simultaneously or substantially simultaneously at an ion source region of a mass spectrometer. Positive ions of detached components of the particle and of components of the particle core are detected by a first detection channel of the mass spectrometer. Optionally, negative ions of detached components of the particle and of components of the particle core are detected by a second detection of the mass spectrometer, wherein the first and second detection channel are preferably located at opposing sides of the ion source region.

For example, after an optical desorption or ablation of particle components, two different ionization mechanisms take place simultaneously during applying ionizing UV radiation of different intensity and/or different beam profile to both the desorption cloud or plume around the residual particle core and the particle core. Preferably, the beam profile is spatially adjusted as follows: A parallel beam of sufficient intensity and a wavelength of 248 nm (or 266 nm) impinges on the desorption cloud with the contained PAHs and the refractory particle core in the center. It selectively ionizes the contained PAHs, which are detected in the positive flight tube (first detection channel) of the mass spectrometer. The parallel beam is superimposed by a much more intense, e.g. collinear beam, preferably from the same laser source, for example by a focusing mirror behind the ion source. This "core beam" hits the particle nucleus (residual core of the particle) and causes laser desorption and ionization (LDI) at the same time or within a short period of time, preferably within less than 1 ns corresponding to the light travel time difference between the two beams. The resulting positive mass spectrum thus shows i.a. inorganic substances at low masses and PAHs in the higher mass range, while the negative spectrum shows i.a. inorganic substances.

A particularly advantageous feature of the approach disclosed herein is that, via the special intensity and/or beam profile of the UV laser(s), the cloud produced in the desorption step is not only irradiated by the first beam having a larger diameter and lower intensity and causing a resonant ionization, in particular resonance-enhanced multiphoton ionization (REMPI), of detached components, but also irradiated in a considerably smaller volume, i.e. at the residual particle core, by the second beam having a smaller diameter and higher intensity, whereby also a non-resonant ionization of further organic constituents of the particle occurs. Due to higher intensity, this may lead to a considerable fragmentation resulting in mass spectra having many additional peaks that cannot predominantly be assigned to unique substances. However, in addition to a direct indication of the presence of organic substances and the approximate distribution of their masses, there are often characteristic fragment patterns that represent certain classes of molecules. In the negative spectrum these peaks are less structured and may be associated with oligomers. That is, in addition to a reliable and detailed proof of PAHs and the elemental composition of the particle, the approach also provides information about further organics.

In summary, the invention provides an enhanced device and method for mass spectroscopic analysis of particles, which in particular reveals enhanced and/or more detailed and reliable information regarding the composition of individual particles.

Alternatively to causing an ionization of only a part of the components of the residual core of the particle by the second beam, a complete disintegration and ionization of the whole residual particle core using a laser of high pulse energy for generating the second beam is possible. While lighter and/or volatile substances are ionized by the first beam, heavier substances in the core proximity are ionized by the second beam.

Alternatively or additionally to IR desorption, at least one of the following processes using ultra-short optical pulses are preferred to cause components of the particle to detach from, in particular the surface of, the particle: targeted desorption of components from the particle surface while excluding the bulk, optical ablation, targeted surface rupture to release the bulk materials into the plume for their exclusive MS-analysis.

Alternatively or additionally to LDI, the particle to be analyzed can be provided or coated with a matrix substance for Matrix-Assisted LDI (MALDI), enhancing the sensitivity and/or selectivity and/or coverage of the method. In particular, aromatic matrix-substances as 2,5-Dihydroxybenzoic acid (DHB) can be ionized within the REMPI process, providing an independent information channel to the particle MALDI ionization, both exploiting the targeted optical excitation schemes for plume and residual disclosed in the current invention.

It is further preferred that the approach disclosed herein can also be applied for analyzing bio-aerosoles (bacteria, viruses, spores, pollen, eukaryotic cells), as exemplarily mentioned as follows:

(a) surface cracking/rupture of cell wall/membrane to ionize and MS analyze the cell interior, e.g. for pollen or spores identification.

(b) Targeted desorption/ablation of cell surface components and their subsequent ionization and MS analysis using the described method.

(c) Application as an add-on method for flow cytometry to analyze single cells with the method.

It is further preferred to use the approach disclosed herein to measure the inner surface or the adsorption capacity of single particles. To this purpose, particles are stripped in a heated cell, so that volatile substances evaporate. Subsequently, particles are guided through an adsorption cell, where aromatic substances are adsorbed, e.g. in a monolayer. The latter can be ionized and quantified via REMPI by the method disclosed herein while the particle residual is also analyzed, allowing for conclusions on the particle's adsorption capacity and its refractory composition via LDI.

In the preferred configuration described above, advantageously only one ionization laser is needed. Alternatively, it is possible to provide two ionization lasers for generating the two different beams of ionizing radiation.

It is, therefore, preferred that the second irradiation unit comprises a first irradiation source, in particular a first laser source, configured to generate the first beam of electromagnetic radiation, and a second irradiation source, in particular a second laser source, configured to generate the second beam of electromagnetic radiation. Preferably, the first radiation source is configured to generate electromagnetic radiation at a first wavelength or in a first wavelength range, and the second radiation source is configured to generate electromagnetic radiation at a second wavelength or in a second wavelength range, wherein the first wavelength is larger than the second wavelength and/or the first wavelength range is located at higher wavelengths than the second wavelength range. Providing two irradiation sources, rather than only one, for generating the first and second beam allows for irradiating the detached components, on the one hand, and the residual particle core, on the other hand, with radiation of different energy (wavelength) so that, by selecting different energies or wavelengths, an even more specific ionization of detached components of the particle and/or components of the residual particle can be achieved. As a result, it is possible to reveal even more enhanced and/or specific information regarding the composition of individual particles.

According to yet another preferred embodiment, the second irradiation unit comprises an irradiation source, in particular a single laser source, configured to generate the first beam of electromagnetic radiation, and an optical element configured to generate the second beam of electromagnetic radiation. Preferably, the first beam of electromagnetic radiation is a substantially parallel beam. Alternatively or additionally, the optical element is preferably a focusing optical element configured to generate the second beam of electromagnetic radiation by focusing at least a part of the first beam. It is further preferred that the second irradiation unit is arranged such that the first beam of electromagnetic radiation impinges at a first side of the detached components and/or the residual core of the particle, and the optical element comprises a focusing mirror located at a second side of the detached components and/or the residual core of the particle, wherein the second side is opposite to the first side. The aforementioned preferred embodiments further contribute, alone or in combination, to reveal enhanced and/or more detailed and reliable information regarding the composition of individual particles in a simple and reliable way.

Preferably, the second irradiation unit is configured such that a time difference between the irradiation of the detached components, and optionally the residual core of the particle, with the first beam and the irradiation of the residual core of the particle with the second beam is less than 20 ns, preferably less than 5 ns, in particular less than 1 ns. In this way, a substantially simultaneous irradiation and/or ionization of detached components contained in the cloud or plume, on the one hand, and of the residual core of the particle is, on the other hand, with beams of different intensity, and optionally different wavelengths, is achieved.

It is further preferred that the first beam of electromagnetic radiation is configured to cause a resonant ionization of at least a part of the detached components and/or the second beam of electromagnetic radiation is configured to cause a non-resonant ionization of at least a part of the components of the residual core of the particle. Preferably, the resonant ionization corresponds to resonantly enhanced multiphoton ionization (REMPI), which is particularly sensitive and selective for aromatic substances and can be, e.g., induced by the fourth harmonic of a Nd:YAG laser (266 nm) or by an KrF-Excimer laser pulse (248 nm). Other lasers and wavelengths, including single-wavelength and tunable lasers, can be used for this purpose, e.g. optical parametric oscillators, optical parametric amplifiers, dye lasers as well as femtosecond (fs) lasers for generating ultra-short laser pulses.

According to another preferred embodiment, the first detection channel is configured to detect the positive ions with a first detection sensitivity, and the second detection channel is configured to detect the negative ions with a second detection sensitivity, and wherein the device further comprises a control unit configured to control the first and/or second detection sensitivity dependent on the mass or mass-to-charge ratio of the positive or negative, respectively, ions. In this way, particular ions, e.g. ions of the PAHs and/or ions of further organic components which would cause lower detection signals (without adaptation of the detection sensitivity), can be detected with a higher sensitivity than other ions, e.g. ions of inorganic components which are mainly generated by the second beam, preferably via LDI, and would cause higher detection signals (without adaptation of the detection sensitivity).

Preferably, the control unit is configured to vary the first and/or second detection sensitivity while ions of the detached components of the particle and/or ions of the components of the residual core of the particle are being detected by the first and/or second detection channel. Preferably, the first and/or second detection sensitivity is varied dependent on the time of flight (TOF) the positive or negative ions need for traveling from the ion source region, via a positive or negative flight tube, to the positive or negative ion detector of the mass spectrometer. In particular, the sensitivity of the respective detection channel can be varied by quickly varying or modulating the transmissivity of the respective flight tube with time. As the time of flight of an ion depends on the mass of the ion, the detection sensitivity depends on the mass of the detected ions. In this way, the positive or negative channel can detect positive or negative, respectively, ions which are generated by both the first and second beam of radiation with high accuracy and reliability, even in the case that some of the ions, e.g. ions generated by the second beam, would cause a considerably stronger detection signal than another part of the ions, e.g. ions generated by the first beam.

Preferably, the mass spectrometer comprises a TOF sensor, in particular a high-resolution TOF (HR-TOF) sensor, configured to detect and/or analyze the TOF of the detected ions.

Alternatively, the mass spectrometer may comprise an ion trap mass analyzer, e.g. from Orbitrap®, comprising an outer barrel-like electrode and a coaxial inner spindle-like electrode that traps ions in an orbital motion around the spindle. The image current from the trapped ions is detected and converted to a mass spectrum using the Fourier transform of the frequency signal.

Alternatively or additionally, the control unit is configured to set the first and/or second detection sensitivity to at least one first sensitivity value when the ions exhibit a first mass or mass-to-charge value or range, and to at least one second sensitivity value, which is higher than the first sensitivity value, when the ions exhibit a second mass or mass-to-charge value or range, which is larger than the first mass or mass-to-charge value or range. In this way, lighter ions generated by the second beam, preferably via LDI, and having a smaller mass or mass-to-charge ratio, which is preferably smaller than 100, are detected with lower sensitivity, while heavier ions having a larger mass or mass-to-charge ratio, which is preferably larger than 100, are detected with higher sensitivity. That is, by varying or modulating the transmission of the positive and/or negative flight tube while the positive or negative ions pass through the flight tube, the sensitivity of the respective detection channel for ions of different mass values and/or mass-to-charge ratios can be adapted.

For example, a mass filter, preferably a so-called Badbury-Nielsen Gate, is provided, preferably in the positive and/or negative flight tube, which exhibits a lower transmissivity for lighter ions and a higher transmissivity for heavier ions. Alternatively or additionally, a voltage applied at the deflective ion optics in the flight tube and/or detection channel is modulated, preferably by means of fast high-voltage switches.

Preferably, a preferred aspect of the invention disclosed herein allows for mass spectroscopic characterization of single particles by spatially and/or temporally adapted laser desorption and ionization which provides i) mass spectra of resonantly ionized aromatic substances, ii) mass spectra of positive ions of refractory and inorganic substances from non-resonant ionization in the higher intensity sub-beam, and iii) mass spectra of negative ions of refractory and inorganic substances. In addition, many other ions can be detected, which originate from the transition region of the intensities of both partial beams, i.e. the first beam and the second beam, and can be generated either by (resonant)

ionization with a lower interaction cross-section, such as derivatives of PAHs and other organic substances, or represent fragments. In the case of high organic content particles (e.g., Secondary Organic Aerosol, SOA), very complex mass spectra with many peaks are formed. In particular, lighter masses can be assigned quite clearly to the inorganic components, since either no meaningful molecular compositions are possible (e.g. mass-to-charge ration m/z=23 for $Na^+$ or m/z=40 for $Ca^+$) or certain series (e.g. m/z=12, 24, 36, 48 etc. for carbon clusters from carbon black) or isotopic compositions (e.g. m/z=54,56 in certain ratio for iron isotopes). The PAHs, for their part, always appear in a homologous series of definite higher masses ($m_{PAH}$=178, 189, 202, 228, 252 etc.) and can therefore also be assigned quite clearly.

The situation is different, however, with numerous peaks that may be obtained from further masses, in particular from mass m/z≈100. For some particles, typical fragment patterns in the range below m/z≈40 . . . 120 can be seen, as they are typical for ionization with high fragmentation for some classes of molecules. However, as natural aerosols usually consist of many different substances and, with the approach disclosed herein, heavier molecular ions are frequently observed, there is a need for intelligent pattern recognition and evaluation strategies.

For example, as additional information obtained from unassignable signals in the mass spectrum, their distribution provides an approximate measure of the maximum molecular weights that occur, and thus the occurrence of low volatility compounds and oligomers.

According to preferred embodiment, the first detection channel is configured to record a first mass spectrum of the detected positive ions, and the second detection channel is configured to record a second mass spectrum of the detected negative ions, and wherein the device further comprises a processing unit configured to: i) perform a Fourier transformation of the first mass spectrum to obtain a first Fourier spectrum and/or to perform a Fourier transformation of the second mass spectrum to obtain a second Fourier spectrum, ii) identify one or more first amplitudes of one or more components of the first Fourier spectrum and/or one or more second amplitudes of one or more components of the second Fourier spectrum, and iii) derive information regarding identity and/or substance class and/or amount, in particular relative amount, of one or more components of the particle based on the one or more first amplitudes and/or one or more second amplitudes. Preferably, the processing unit is configured to derive information regarding an amount, in particular a relative amount, of two components of the particle based on a relation between, preferably on a ratio of, two first amplitudes and/or a relation between, preferably a ratio of, two second amplitudes and/or a relation between, preferably a ratio of, a first amplitude and a second amplitude. These embodiments, in combination or alone, further contribute to reveal enhanced information regarding the composition of individual particles as will be explained in more detail as follows.

By performing a Fourier transformation of the positive and/or negative mass spectra it is possible to identify a regular appearance of peaks in the mass spectra, e.g. regular peaks in a rhythm of 14 m/z resulting from a homologous series (e.g., alkanes, alkenes, etc.) as well as their fragment patterns due to additional (or split-off) $CH_2$ group(s). The Fourier spectra reveal amplitudes of certain rhythmic patterns in a simple and fast way.

In contrast to numerous organic compounds and fragments with a 14 m/z rhythm and strongly oxygen-containing series with an additional 16 m/z rhythm, for poly-aromatics, after laser ionization, a pronounced 12 m/z rhythm is found.

Another possible source for a 12 m/z rhythm are carbon clusters, which, however, clearly differ in their distribution and also occur in rather smaller masses. Compounds of organic substances and carbon clusters, each with a carbon atom mass difference can be excluded, since in this case, the free carbon atom on the mass 12 would appear for the same particle. However, this is very rare and only the case with a pronounced carbon black matrix.

The 12 m/z regularity of PAHs also applies to their derivatives (e.g., oxides), which mathematically appear as linear combinations of $m_{PAH}$+x and contribute to the mass spectra produced by the approach disclosed herein.

Since preferably no negative ions of the PAHs are formed by laser ionization, in the mass spectra of the negative ions the 14 m/z rhythm resulting from organic molecular ions and fragments is prevalent.

Preferably, in the spectrum of the positive ions the amplitude ratio of 12 and 14 (and other) m/z rhythms can be used as a measure of the relative proportion of aromatic substances.

Surprisingly, the aforementioned method not only works for readily identifiable pure poly-aromatics, but also for the totality of their derivatives, which are not identifiable as individual substances by their mass alone. Here, a high degree of oxidation or alkylation leads to a shift and modulation of the overall pattern, while maintaining the 12 m/z regularity.

In summary, applying a Fourier transformation to single mass spectra of particles or other compositions allows for identifying proportions of different classes of molecules within the particle and/or for estimating a proportion of (poly-) aromatic substances without requiring exact knowledge of their exact composition and distribution. In this way, the distribution of PAHs and their derivatives on individual particles can be assessed and their importance in the formation of secondary aerosols and their contribution to the health effects of air pollution can be much better determined.

Alternatively, the above object of the invention is achieved by a device and method for mass spectroscopic analysis of particles according to a third and fourth aspect of the invention.

A device for mass spectroscopic analysis of particles according to the third aspect of the invention comprises: a first irradiation unit configured to irradiate a particle with electromagnetic radiation to cause components of the particle to detach from the particle, the detached components of the particle being located in proximity of a residual core of the particle, a second irradiation unit configured to irradiate, substantially simultaneously or successively, i) at least a part of the detached components, and optionally the residual core of the particle, with a first beam of electromagnetic radiation to cause an ionization of at least a part of the detached components, the first beam of electromagnetic radiation exhibiting a first intensity, and ii) at least a part of the residual core of the particle with a second beam of electromagnetic radiation to cause an ionization of at least a part of the components of the residual core of the particle, the second beam of electromagnetic radiation exhibiting a second intensity, which is larger than the first intensity, and a mass spectrometer comprising an ion source region configured to accommodate positive ions and/or negative ions of the detached components and/or of the components of the residual core, a first detection channel operated and/or configured to detect positive ions generated by ionization of the detached components by the first beam, and a second detection channel which is operated and/or configured to detect positive ions generated by ionization of components of the residual core of the particle by the second beam, the first and second detection channel being arranged at opposing sides of the ion source region.

A method for mass spectroscopic analysis of particles according to the fourth aspect of the invention comprises the following steps:

a) irradiating a particle with electromagnetic radiation to cause components of the particle to detach from the particle, the detached components of the particle being located in proximity of a residual core of the particle, b) irradiating, substantially simultaneously or successively, i) at least a part of the detached components, and optionally the residual core of the particle, with a first beam of electromagnetic radiation to cause an ionization of at least a part of the detached components, the first beam of electromagnetic radiation exhibiting a first intensity, and ii) at least a part of the residual core of the particle with a second beam of electromagnetic radiation to cause an ionization of at least a part of the components of the residual core of the particle, the second beam of electromagnetic radiation exhibiting a second intensity, which is larger than the first intensity, wherein positive ions and/or negative ions of the detached components and/or of the components of the residual core are accommodated in an ion source region, and c) detecting positive ions, which were generated by ionization of the detached components, by the first beam by a first detection channel and detecting the negative ions, which were generated by ionization of components of the residual core of the particle by the second beam, by a second detection channel, the first and second detection channel being arranged at opposing sides of the ion source region.

According to preferred embodiments of the third and fourth aspect, the mass spectrometer comprises two opposite flight tubes, wherein one of the flight tubes has a changeable polarity for combined $LDI^+/LDI^-$ measurements. Preferably, the device is equipped with a velocimetric sizing unit comprising two continuous-wave (cw) Nd:YAG lasers (532 nm) and photomultipliers (PMT) to detect the particles' Mie-scattering signal. An electronic device provides real-time triggering of the desorption laser (first irradiation unit) and ionization lasers (second irradiation unit) and records the individual particle speed as sizing information. Preferably, particles are introduced within a 0.1 liters/min gas stream through an aerodynamic lens system. Three pairs of laser viewports for the corresponding wavelengths give optical access to the ionization region. A pulsed $CO_2$-laser is applied for efficient desorption by intense IR radiation (10.6 μm), while excimer lasers provide UV pulses for subsequent REMPI of the plume (first beam) and LDI of the residual particle (second beam). It is possible to focus the respective beams only moderately in order to achieve a large focal area in the interaction with the particle and thus a high hit rate.

Preferably, the third and fourth aspect are based on the general approach of separating positive (molecular) ions from the two ionization processes (caused by the first and second beam, respectively) and to assign them to either one (LD-REMPI) or the other ($LDI^+$) flight tube, respectively. Therefore, both tubes are operated in positive mode, wherein the polarity of the extraction electrodes is reversed between the two ionization processes using fast high-voltage switches (e.g. model HTS31-03-GSM, rise time <20 ns, Behlke GmbH).

More specifically, at a size-dependent flight time $t_{ptof}$ which is elapsed since passing the sizing unit, a particle arrives at the ion source region of the mass spectrometer. When approaching the extraction region, the 10.6 μm IR pulse hits it for laser desorption. The generated plume expands with a specific velocity depending on the particle size, laser intensity, and energy uptake. Meanwhile, it travels further, keeping its initial speed. In an extraction region, a 248 nm UV pulse (first beam) hits the plume and selectively ionizes PAHs being immediately extracted into the (positive) first flight tube. A delay of 7±3 μs between LD and REMPI pulse is preferred for optimal PAH sensitivity, reflecting the plume expansion dynamics at the respective desorption laser intensity. Extraction time for PAHs from the ion source is preferably about 1 μs. Hence, the switches for field inversion are preferably triggered 1.5 μs after the REMPI pulse. The final 193 nm pulse (second beam) for LDI fires immediately after field inversion is completed. Now refractory substances are ionized and analyzed in the opposite flight tube. About 2 μs have elapsed since REMPI ionization, a period shorter than the typical particle travel time through the, e.g. 2 mm long, extraction channel of the ion source region. The two TOF-spectra and the $t_{ptof}$ time from the sizing/triggering unit for each single particle are recorded and the individual mass spectra and aerodynamic size are calculated.

Regarding preferred embodiments of the third and fourth aspect of the invention, the above elucidation regarding preferred embodiments of the first and second aspect of the invention apply accordingly.

It is noted that the aspect of velocimetric sizing described above in connection with the third and fourth aspects is preferably also applied to the first and second aspect of the invention, i.e. the device is equipped with a velocimetric sizing unit comprising two continuous-wave (cw) Nd:YAG lasers (532 nm) and photomultipliers (PMT) to detect the particles' Mie-scattering signal, and an electronic device provides real-time triggering of the desorption laser (first irradiation unit) and ionization lasers (second irradiation unit) and records the individual particle speed as sizing information.

Alternatively to the aspect of velocimetric sizing, a realization of the approaches disclosed herein comprises the analysis of particles in the free-running mode, where particles are hit without optical detection prior to the desorption and ionization steps using lasers of high repetition rates. By this realization, also particles being too small for optical detection can be analyzed. Size information can be obtained from aerosol size classification prior to desorption/ionization, e.g. by a chopper system or an aerodynamic aerosol classifier. The free-running mode can also be mixed or regularly alternate with the normal active sizing mode.

It is noted that the aspects of the invention disclosed herein are not necessarily limited to a specific sequence of irradiation steps, to specific wavelengths of the radiation by which the particle, the detached components and/or the particle core is/are irradiated, or to specific ionization mechanisms. Rather, aspects of the invention may encompass one or more of the following alternatives, preferred embodiments or applications.

For example, it is possible first to irradiate the particle with the second beam of electromagnetic radiation of higher intensity, e.g. with a femtosecond pulse of UV radiation, and then to irradiate the residual particle with electromagnetic radiation generated by the first irradiation unit to cause components of the particular to detach from the residual particle and to form a cloud or plume which is subsequently irradiated with the first beam of electromagnetic radiation of lower intensity. For example, in the first step a femtosecond laser ablation of the particle is possible in order to detach and/or ionize components only from the particle surface, e.g. adsorbates or cell surfaces, or to slice pollen.

For example, it is further possible first to irradiate the particle with IR radiation generated by the first irradiation unit to cause components of the particle to detach and then to use UV radiation at a wavelength of 248 nm or 193 nm for both the first beam to cause REMPI and the second beam to cause LDI.

For example, it is also possible first to irradiate the particle with IR radiation generated by the first irradiation unit to cause components of the particle to detach and then to use UV radiation at a wavelength of 157 nm for both the first beam to cause single photo ionization (SPI) and the second beam to cause LDI. Apart from UV radiation at a wavelength of 157 nm, also a wavelength of 118 nm (e.g. by harmonic upconversion of a solid-state laser, e.g. Nd:YAG-laser) or tunable UV/VUV light sources (e.g. synchrotron radiation) and VUV lamps suitable for single-photon ionization can be used.

For example, it is further possible first to irradiate the particle with IR radiation generated by the first irradiation unit to cause components of the particle to detach and then to use UV radiation at a wavelength of 248 nm for both the first beam to cause REMPI and the second beam to cause LDI and, simultaneously or successively, to use UV radiation at a wavelength of 157 nm to cause SPI in the plume.

For example, it is possible first to irradiate the particle with IR radiation generated by the first irradiation unit to cause components of the particle to detach and then to use UV radiation at a wavelength of 248 nm for the first beam to cause REMPI in the plume. Then, the polarity of an ion flight tube is inversed (see third and fourth aspect described above), and UV radiation at a wavelength of 157 nm is used to cause SPI in the plume.

For example, it is possible first to irradiate the particle with IR radiation generated by the first irradiation unit to cause components of the particle to detach and then to cause a femtosecond ionization of the particle core and/or detached components with ultrashort and/or formed pulses or sequences of pulses.

For example, the surface of a particle is analyzed regarding toluene or benzene by using UV laser at a wavelength of 248 nm, wherein in the positive detection channel positive $LDI^+$ ions, benzene and PAHs, are detected, while in the negative channel negative $LDI^-$ ions are detected.

Further advantages, features and examples of the present invention will be apparent from the following description of following figures.

Figure 1:
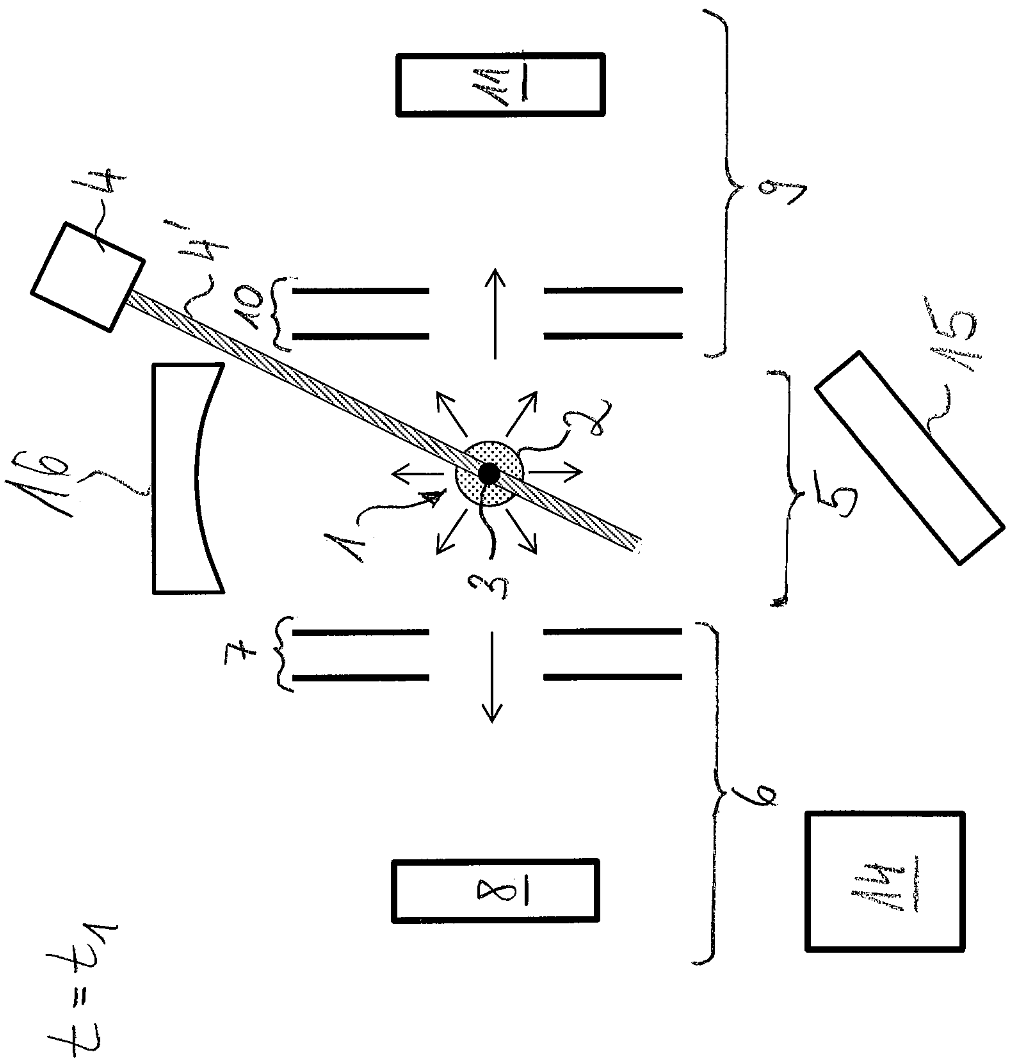
FIG. 1 shows an example of a device for spectroscopic analysis of particles at a first point in time.

FIG. 1 shows an example of a device for spectroscopic analysis of particles at a first point in time $t_1$. The device comprises a first irradiation unit 4, e.g. an infrared (IR) laser, which generates a light beam 4', also referred to as desorption beam, which is directed towards a single particle 1 to cause components of the particle 1 to detach from the particle 1, as indicated by radially extending arrows, whereby a cloud or plume 2 of detached components of the particle 1 is formed around a residual particle core 3.

Alternatively or additionally to using an IR laser to cause components of the particle 1 to desorb from the particle 1, it is possible to use different laser types, in particular a laser type configured to generate ultra-short optical pulses, to cause an ablation of components from the particle 1. Same applies accordingly to laser types configured to cause an evaporation of components from the particle 1.

Preferably, the described desorption of components of the particle 1 is performed in an ion source region 5 of a mass spectrometer, which comprises a first detection channel 6 by which positive ions can be detected, and a second detection channel 9 by which negative ions can be detected. Each of the detection channels 6 and 9 comprises extraction electrodes 7 or 10, respectively, by which positive or negative, respectively, ions are extracted from the ion source region 5 and accelerated towards a detector 8 or 11, respectively, where positive or negative, respectively, ions are detected. Within present disclosure, the detection channels 6 and 9 are also referred to as flight tubes.

The detection channels 6 and 9, including extraction electrodes 7 and 10 and detectors 8 and 11, are arranged at opposing sides of the ion source region 5 of the mass spectrometer.

The device further comprises a second irradiation unit 14 to 16 which is configured to irradiate both the plume 2 of detached components and the residual particle core 3. This will be described in more detail in the following.

Figure 2:
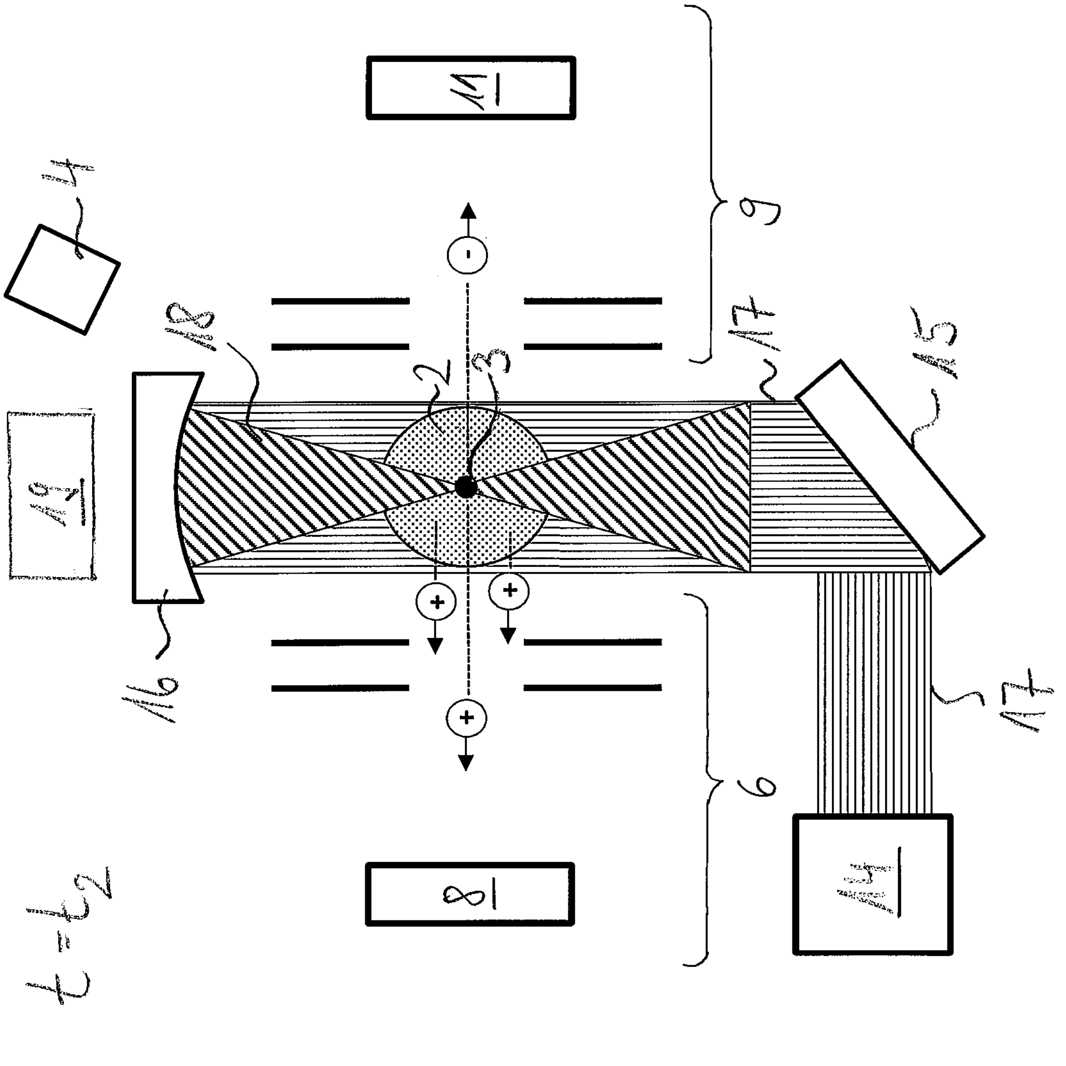
FIG. 2 shows an example of a device for spectroscopic analysis of particles at a second point in time.

FIG. 2 shows an example of a device for spectroscopic analysis of particles at a second point in time $t_2$, which is preferably 6 to 8 μs, in particular approximately 7 μs, later than $t_1$. At the second point in time $t_2$, the first irradiation unit 4 is preferably in an off state, while an irradiation source 14, for example an ultraviolet (UV) laser, of the second irradiation unit 14 to 16 generates a first beam 17 of, preferably pulsed, radiation which is directed, e.g. by means of deflection element 15, towards the plume 2 of detached components and the residual particle core 3 surrounded by the plume 2 and, after having passed the plume 2, towards optical element 16.

The optical element 16, preferably a focusing mirror, focuses the deflected first beam 17 into a focused second beam 18 which is directed towards the residual particle core 3. Preferably, the focus of the second beam 18 coincides with the residual particle core 3. As a result, the intensity of the second beam 18 impinging on the residual particle core 3 is considerably, preferably at least 10 times, higher than the intensity of the first beam 17 impinging on the plume 3.

Alternatively to generating the focused second beam 18 by focusing a part of the deflected first beam 17 towards the residual particle core 3, the second beam 18 can be generated by another irradiation source 19, for example another ultraviolet (UV) laser, which generates a beam which is focused by optical element 16, e.g. a focusing lens in this case, towards the particle core 3. In this alternative embodiment, The irradiation sources 14 and 19 are preferably configured to generate beams of radiation at different wavelengths, e.g. at 248 nm and 193 nm, respectively.

The deflected first beam 17 and the focused second beam 18 impinge on the plume 2 and the particle core 3, respectively, simultaneously or substantially simultaneously, whereby a possible small time difference of preferably less than 1 ns may result from different light propagation times of the first beam 17 and the second beam 18 prior to impinging on the plume 2 or on particle core 3, respectively.

When impinging on the plume 2 and the residual particle core 3, the deflected first beam 17 causes a resonance-enhanced multiphoton ionization (REMPI) of detached components contained in the plume 2, whereby predominantly positive ions (+), preferably positive ions of PAHs, are generated. Apart from positive ions (+), however, also negative ions (not shown) of components contained in the plume 2 and/or by other ionization processes may be generated.

At the same time or substantially the same time, the focused second beam 18 impinges mainly on the residual particle core 3 and causes a non-resonant desorption and ionization, also referred to as laser desorption and ionization (LDI), of components contained in the particle core 3, whereby both positive ions (+) and negative ions (−) are generated (see dashed lines illustrating that these ions emerge from the particle core 3 rather than from the plume 2).

The ions generated by REMPI (i.e. predominantly positive ions (+)) and LDI (i.e. positive ions (+) and negative ions (−)) are detected by detector 8 of the first detection channel 6 or detector 11 of the second detection channel 9, respectively.

Due to the different ionization mechanisms (i.e. REMPI and LDI) induced by different intensities of the first and second beam 17 and 18, the detection signals generated by the respective detector 8, 11 when detecting ions generated by REMPI of the plume 2 are considerably smaller than the detection signals generated when detecting ions of the particle core 3 generated via LDI.

Yet, in order to ensure a particularly accurate and reliable detection of the ions generated by the different mechanisms, preferably the sensitivity of the respective detection channel 6, 9 is adapted as described in the following.

Figure 3:
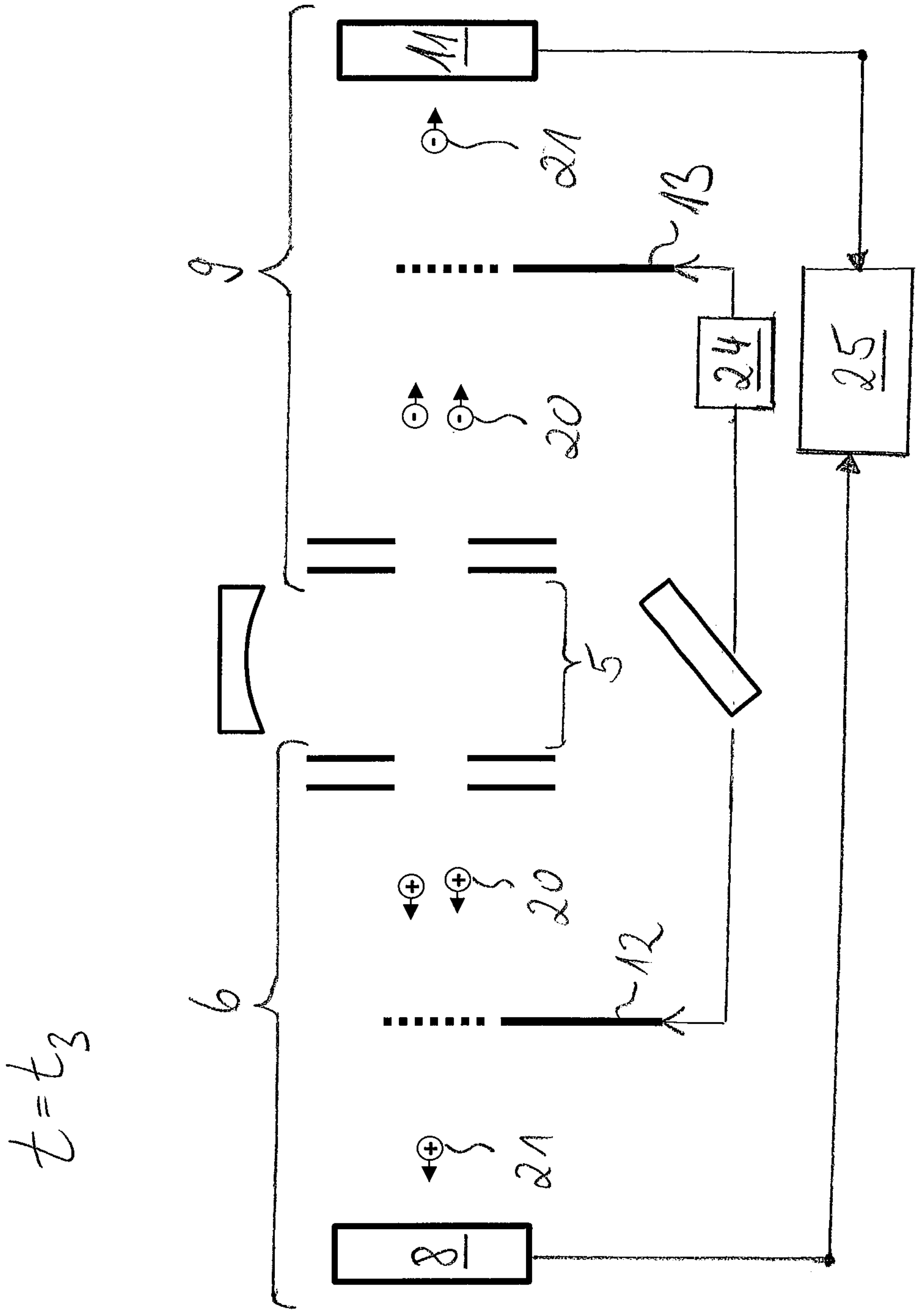
FIG. 3 shows an example of a device for spectroscopic analysis of particles at a third point in time.

FIG. 3 shows an example of a device for spectroscopic analysis of particles at a third point in time $t_3$, which is preferably only few μs later than the second point in time $t_2$. At the third point in time $t_3$, both the first irradiation unit 4 and the irradiation source 14 (see FIG. 2, not shown in FIG. 3) are in an off state, and the ions that were generated in the ion source region 5 of the mass spectrometer have further propagated towards the detector 8 for positive ions (+) and the detector 11 for negative ions (−). For illustration purposes, ions predominantly generated by REMPI of components contained in the plume 2 (see FIGS. 1 and 2) and/or by another ionization process are denoted with reference sign 20, while ions predominantly generated by LDI of components of the residual particle core 3 (see FIGS. 1 and 2) are denoted with reference sign 21.

In order to account for lower detection signals to be expected for ions 20 generated by REMPI or another ionization process compared to detection signals to be expected for ions 21 generated by LDI of the particle core, it is preferred to increase the sensitivity of at least one of the detection channels 6, 9 for heavier ions, e.g. ions having a mass-to-charge ratio of at least 100 being predominantly generated by REMPI, and/or to decrease the sensitivity of at least one of the detection channels 6, 9 for lighter ions, e.g. ions having a mass-to-charge ration of less than 100 being predominantly generated by LDI.

This is preferably achieved by providing a first sensitivity modulating element 12 in the first detection channel 6 and/or a second sensitivity modulating element 13 in the second detection channel 9. Preferably, the sensitivity modulating element 12, 13 has a transmissivity for ions depending on the mass or mass-to-charge ratio of the ions and/or is configured to, preferably quickly, vary its transmissivity with time. Preferably, a control unit 24 is provided which is configured to control at least one of the sensitivity modulating element 12, 13 to vary its transmissivity for ions accordingly.

For example, the sensitivity modulating element 12, 13 is configured as a Bradbury-Nielsen gate exhibiting an attenuated transmission for lighter ions compared to heavier ions. Alternatively, the sensitivity modulating element 12, 13 may comprise an ion optics, also referred to as attenuation ion optics, configured to laterally deflect ions dependent on a time-dependent and/or modulated voltage applied thereto.

In this way, the transmissivity of the elements 12, 13 for ions and, therefore, the sensitivity of the detection channel 6, 9 can be modulated and adapted to the mass of different ions 20, 21 to be detected. Preferably, the lighter ions 21 are detected with a first sensitivity value which is smaller than a second sensitivity value with which the heavier ions 20 are detected.

In the examples of the device shown in FIGS. 1 to 3, the deflection element 15, which is in particular a deflection mirror, and the optical element 16, which is preferably a focusing or concave mirror, form an optical unit by which at least a part of the first beam 17 is converted into a focused second beam 18 directed towards the residual particle core 3. Advantageously, the optical unit according to this embodiment is robust and compact and allows for easily adjusting the LDI intensity of the focused second beam 18 while a parallel first beam for REMPI is maintained.

Figure 4:
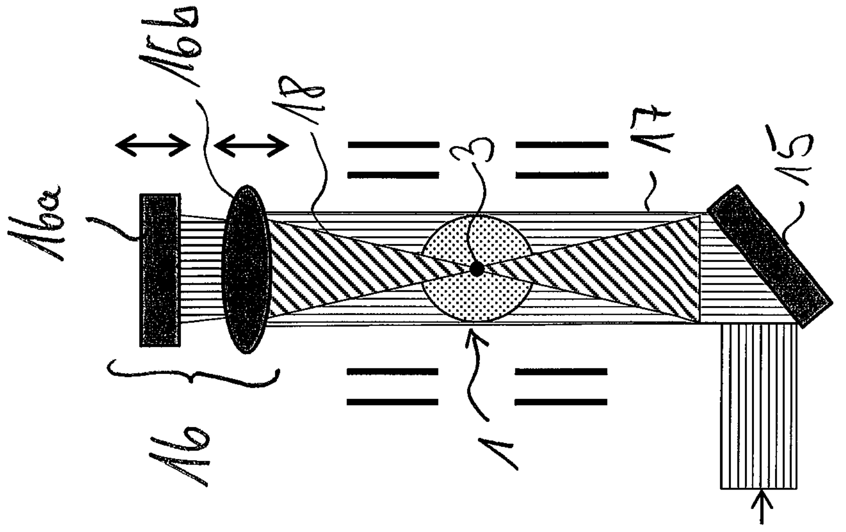
FIG. 4 shows a first alternative example of an optical unit of the device.

FIG. 4 shows a first alternative example of an optical unit of the device, wherein the optical element 16 of the optical unit comprises, instead of a focusing and/or concave mirror (see FIGS. 1 to 3), a preferably moveable planar mirror **16*a* and a preferably moveable focusing lens 16*b*. Both the mirror 16*a* and the lens 16*b* are located (with respect to the deflected first beam 17) behind the particle 1 so that at least a part of the deflected first beam 17 is reflected by the mirror 16*a* and subsequently focused by the lens 16*b*, whereby a focused second beam 18 directed towards and/or impinging on the residual particle core 3 is obtained. Advantageously, this alternative embodiment of the optical unit works very well with simple and cheap components 16*a*, 16*b***, making e.g. a concave mirror dispensable.

Figure 5:
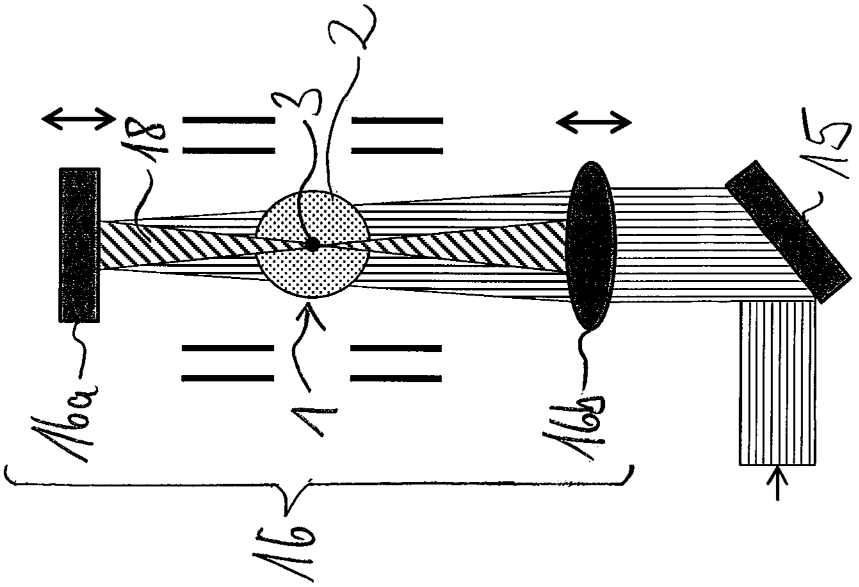
FIG. 5 shows a second alternative example of an optical unit of the device.

FIG. 5 shows a second alternative example of an optical unit of the device, wherein the optical element 16 of the optical unit also comprises a preferably moveable planar mirror **16*a* and a preferably moveable focusing lens 16*b*. In distinction to the example shown in FIG. 4, however, the mirror 16 is located behind the particle 1, whereas the lens 16*b* is located in front of the particle 1. At least a part of the deflected first beam 17 is first focused by the lens 16*b* and subsequently reflected by the mirror 16*a* such that the focus point of the focused and reflected second beam 18 hits the residual particle core 3. Likewise, this alternative embodiment of the optical unit works very well with simple and cheap components 16*a*, 16*b*, making e.g. a concave mirror dispensable. Further, the intensity of the first beam 17 impinging on the plume 2 and preferably causing REMPI in the plume 2 as well as the intensity of the second beam 18 impinging on the particle core 3** and preferably causing LDI can be easily adjusted. Last but not least, a narrow beam at the vacuum chamber exit is achieved so that there is less scattering light inside.

Preferably, the device further comprises a processing unit 25 which is configured to analyze a first mass spectrum of the detected positive ions (+) and/or a second mass spectrum of the detected negative ions (−) by performing a Fourier transformation of the first mass spectrum to obtain a first Fourier spectrum and/or to perform a Fourier transformation of the second mass spectrum to obtain a second Fourier spectrum, and identifying one or more first amplitudes of one or more components of the first Fourier spectrum and/or one or more second amplitudes of one or more components of the second Fourier spectrum. Preferably, the processing unit 25 is further configured to derive information regarding the identity and/or substance class and/or amount, in particular relative amount, of one or more components of the particle based on the one or more first amplitudes and/or one or more second amplitudes. Preferably, applying a Fourier transformation to single mass spectra of particles or other compositions allows for identifying proportions of different classes of molecules within the particle and/or for estimating a proportion of (poly-) aromatic substances without requiring exact knowledge of their exact composition and distribution. In this way, the distribution of PAHs and their derivatives on individual particles can be assessed and their importance in the formation of secondary aerosols and their contribution to the health effects of air pollution can be much better determined.

Figure 6:
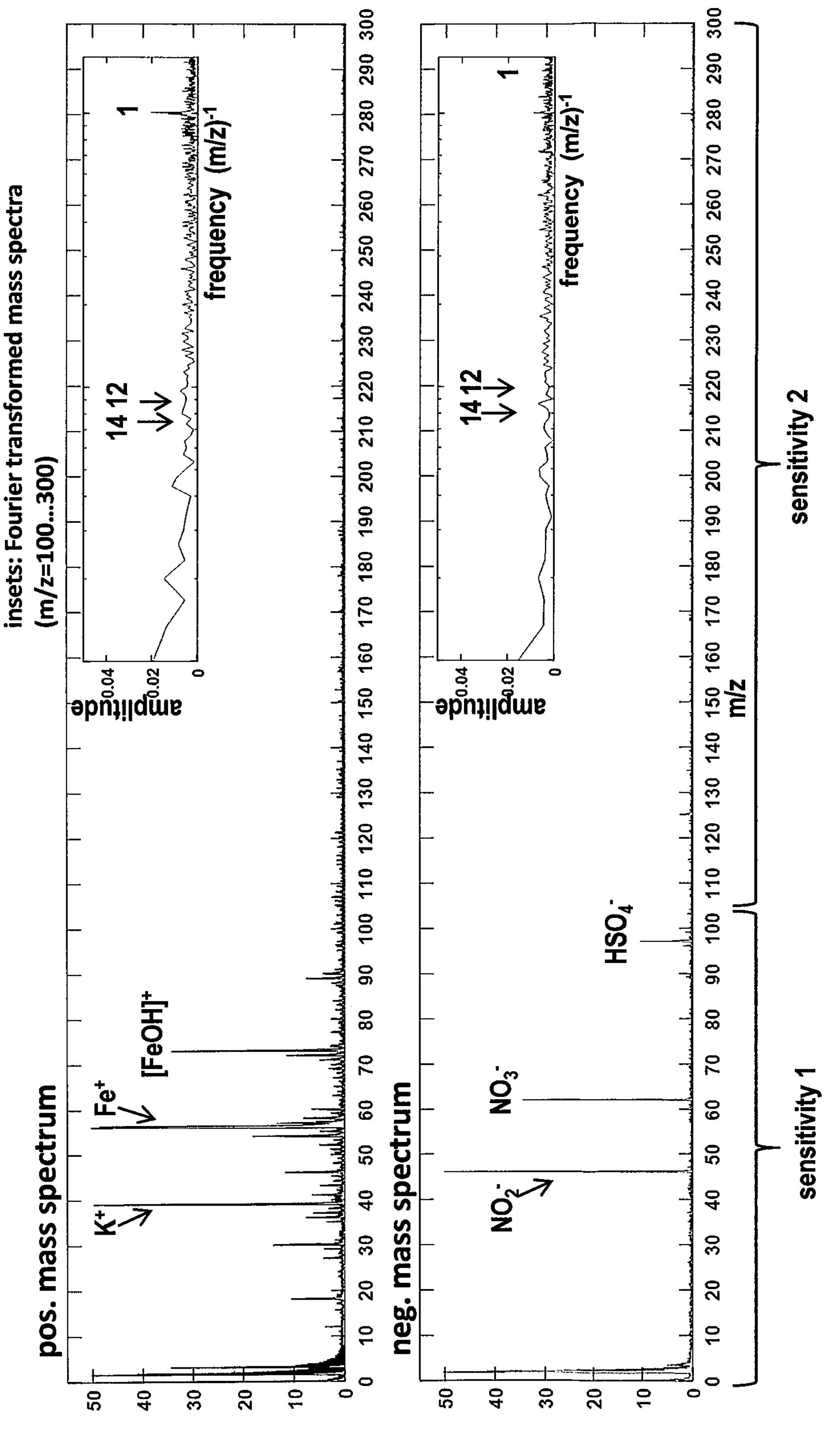
FIG. 6 shows a first example of a positive and negative mass spectrum.

FIG. 6 shows a first example of a positive and negative mass spectrum of a single particle from ambient air. The positive and negative mass spectra correspond to spectra from conventional ATOF-MS method. As apparent form the figure, the mass spectra of the particle are dominated by inorganics, while only little organic molecular, e.g. with a regularity of m/z of 12 or 14, signals are present, corresponding to small amplitudes of the fast Fourier-transformed (FFT) signals (see inset).

Figure 7:
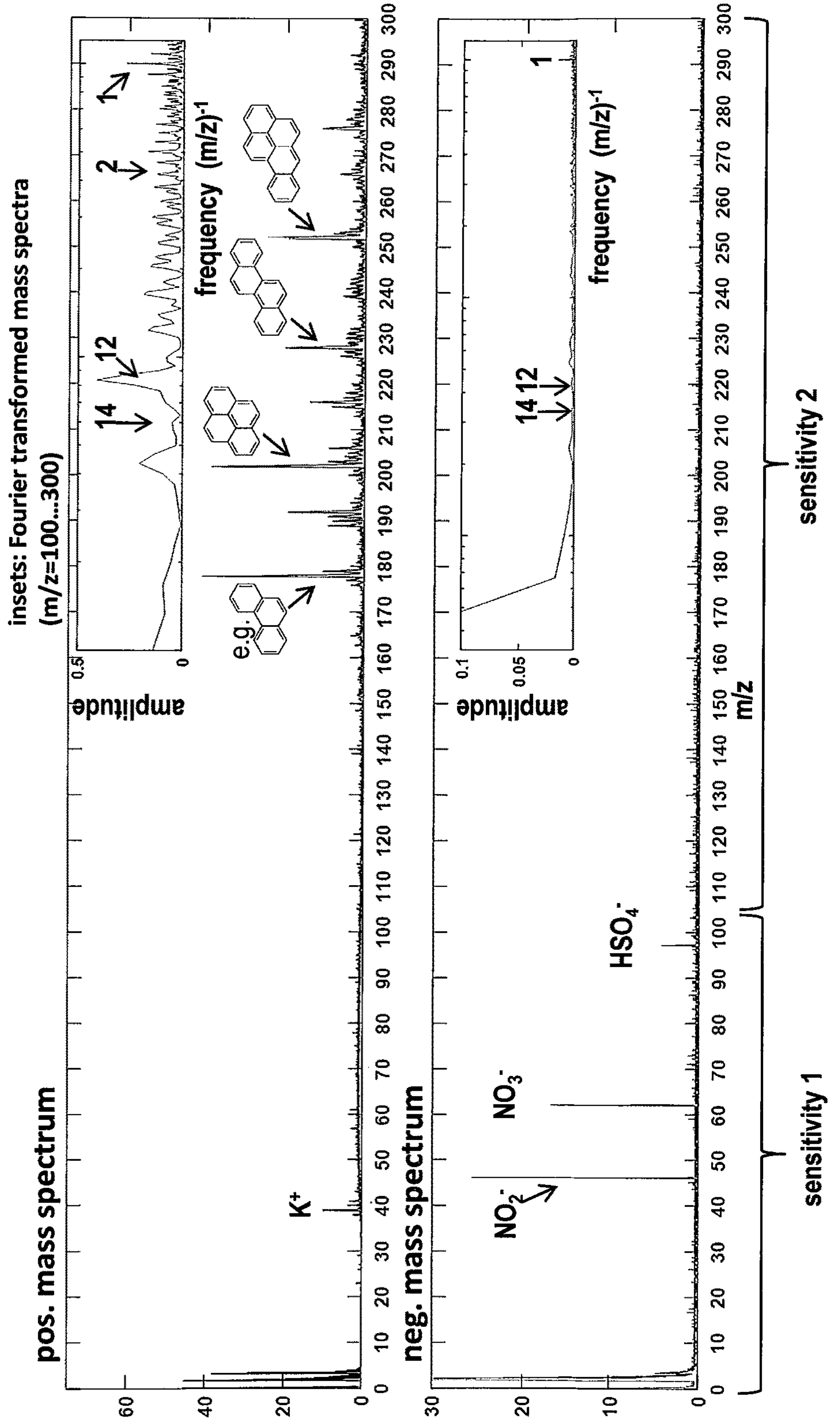
FIG. 7 shows a second example of a positive and negative mass spectrum.

FIG. 7 shows a second example of a positive and negative mass spectrum of a single particle from ambient air. The mass spectra correspond to a combination of conventional ATOF-MS spectra and single-particle PAH spectra. As apparent from the figure, the positive mass spectrum of the particle is dominated by PAHs, wherein organic signals from (alkylated) PAHs yield FFT signals (see inset) of positive ions which are dominated by a regularity of 12.

Figure 8:
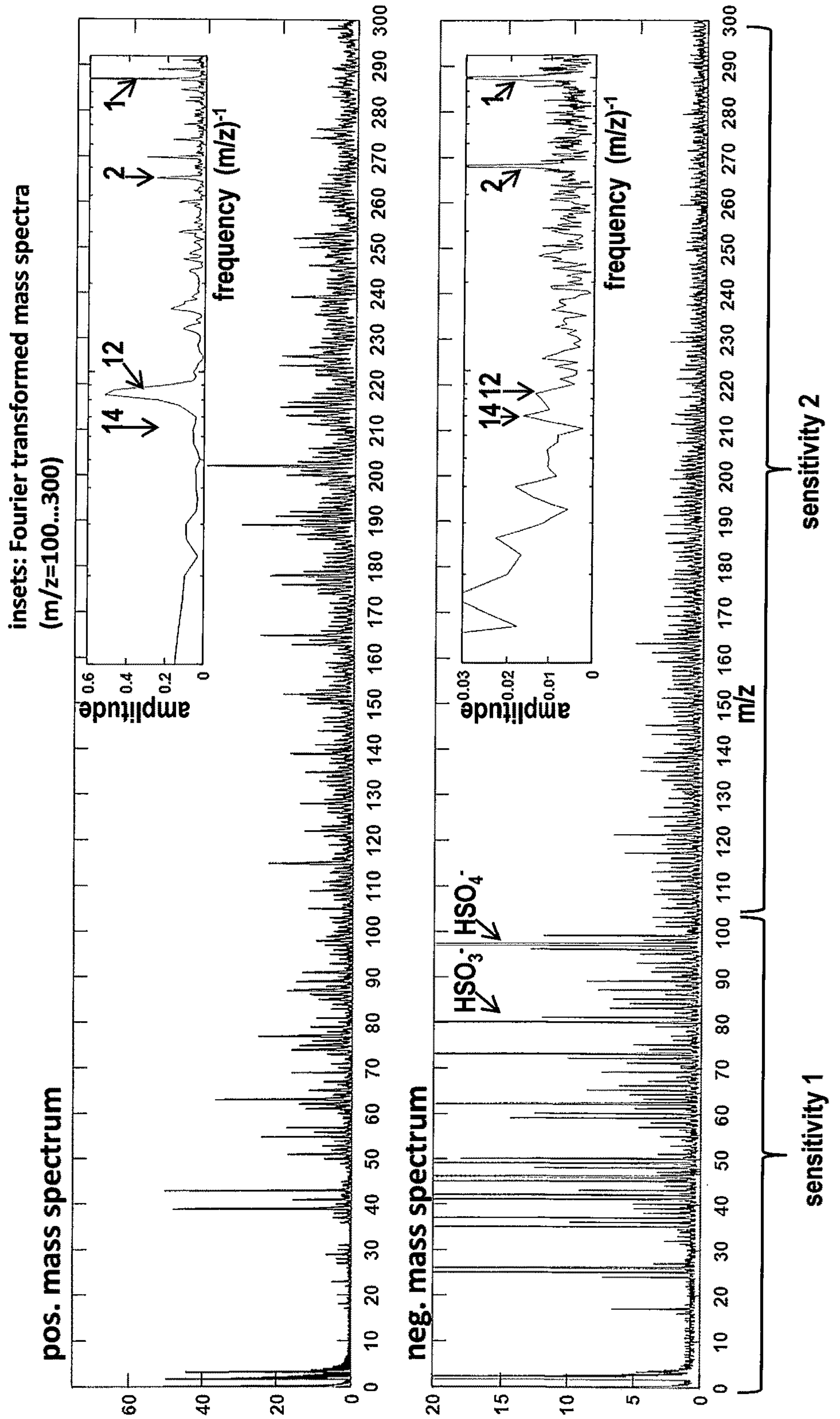
FIG. 8 shows a third example of a positive and negative mass spectrum.

FIG. 8 shows a third example of a positive and negative mass spectrum of a single particle from ambient air. As apparent from the figure, the mass spectra of the particle are dominated by organics from many fragments (in particular for m/z<100), PAHs, PAH-derivatives, possible oligomers etc. Accordingly, PAHs and derivatives are reflected by FFT signals (see inset) with a regularity of 12 for positive ions, while other organics are reflected with a regularity of 14 for positive, and, in particular, for negative ions.

In the exemplary mass spectra shown in FIGS. 6 to 8 different sensitivities "sensitivity 1" and "sensitivity 2" of each of the detection channels 6 and 9 (see FIGS. 1 to 3) are indicated. Preferably, positive and negative ions with lower masses m or mass-to-charge ratio values m/z, e.g. below approximately 105, are detected with a first sensitivity "sensitivity 1" of the first and second detection channel 6 and 9, respectively, whereas positive and negative ions with higher masses m or mass-to-charge ratio values m/z, e.g. above approximately 105, are detected with a second sensitivity "sensitivity 2" of the first and second detection channel 6 or 9, respectively, wherein the second sensitivity "sensitivity 2" is preferably higher than the first sensitivity "sensitivity 1".

The invention claimed is:

1. A device for mass spectroscopic analysis of particles, the device comprising:

a first irradiation unit comprising an IR laser, the first irradiation unit configured to irradiate a particle with electromagnetic radiation to cause components of the particle to detach from the particle, the detached components of the particle being located in proximity of a residual core of the particle, a second irradiation unit comprising a single UV laser and irradiating substantially simultaneously at least a part of the detached components and the residual core of the particle, with a first beam of electromagnetic radiation from the single UV laser to cause a resonance-enhanced multiphoton ionization (REMPI) or single-photon ionization (SPI) of at least a part of the detached components, the first beam of electromagnetic radiation exhibiting a first intensity, and at least a part of the residual core of the particle with a second beam of electromagnetic radiation from the single UV laser to cause a laser desorption and non-resonant ionization (LDI) of at least a part of the components of the residual core of the particle, the second beam of electromagnetic radiation exhibiting a second intensity, which is larger than the first intensity, wherein the second irradiation unit comprises a focusing optical element configured to generate the second beam of electromagnetic radiation by focusing at least a part of the first beam, the focusing optical element comprising i) a focusing mirror or ii) a planar mirror and a focusing lens, the first beam generated by the single UV laser impinging on both the detached components and the residual core of the particle, the second beam focused by the focusing optical element impinging only on the residual core of the particle, so that the irradiation of the detached components of the particle with the first beam and the irradiation of the residual core of same particle with the second beam occurs substantially simultaneously and both the REMPI or SPI of the detached components of the particle and the LDI of the components of the residual core of the particle is caused by electromagnetic radiation from the single UV laser directed towards the particle as the first beam and reflected by the focusing optical element back towards the particle as the second beam, wherein the single UV laser is directed towards the particle as the first beam by a deflection mirror or the single UV laser is oriented towards the particle, and a mass spectrometer comprising an ion source region configured to accommodate positive ions (+) and negative ions (−) of the detached components and/or of the components of the residual core, a first detection channel configured to detect the positive ions (+) and a second detection channel configured to detect the negative ions (−).

2. The device according to claim 1, wherein the first beam of electromagnetic radiation is a substantially parallel beam.

3. The device according to claim 1, wherein the second irradiation unit is arranged such that the first beam of electromagnetic radiation impinges at a first side of the detached components and the residual core of the particle, and the focusing mirror is located at a second side of the detached components and the residual core of the particle, wherein the second side is opposite to the first side.

4. The device according to claim 1, wherein the second irradiation unit is configured such that a time difference between the irradiation of the detached components and the residual core of the particle, with the first beam and the irradiation of the residual core of the particle with the second beam is less than 20 ns.

5. The device according to claim 4, wherein the time difference between the irradiation of the detached components and the residual core of the particle, with the first beam and the irradiation of the residual core of the particle with the second beam is less than 5 ns.

6. The device according to claim 4, wherein the time difference between the irradiation of the detached components and the residual core of the particle, with the first beam and the irradiation of the residual core of the particle with the second beam is less than 1 ns.

7. The device according to claim 1, wherein the first detection channel is configured to detect the positive ions (+) with a first detection sensitivity, and/or the second detection channel is configured to detect the negative ions (−) with a second detection sensitivity.

8. The device according to claim 1, wherein the first detection channel is configured to record a first mass spectrum of the detected positive ions (+), and/or the second detection channel is configured to record a second mass spectrum of the detected negative ions (−).

9. The device according to claim 1, wherein the detachment of the components of the particle comprises desorption, ablation, evaporation, or combinations thereof.

10. The device according to claim 1, wherein the second irradiation unit is arranged such that the first beam of electromagnetic radiation impinges at a first side of the particle, and both the planar mirror and the focusing lens are located at a second side of the particle, wherein the second side is opposite to the first side, so that at least a part of the first beam is reflected by the planar mirror and subsequently focused by the focusing lens, whereby the focused beam is impinging on the residual particular core.

11. The device according to claim 1, wherein the second irradiation unit is arranged such that the first beam of electromagnetic radiation impinges at a first side of the particle, and the planar mirror is located at a second side of the particle, wherein the second side is opposite to the first side, whereas the focusing lens is located at the first side of the particle, so that at least a part of the first beam is first focused by the focusing lens and subsequently reflected by the planar mirror such that the focus point of the focused and reflected beam hits the residual particular core.

12. The device according to claim 1, wherein the first beam and second beam of electromagnetic radiation from the single UV laser have a wavelength of 248 nm, so that the first beam ionizes polycyclic aromatic hydrocarbons (PAHs) contained in the detached components, while the second beam from the single UV laser causes, substantially simultaneously, LDI of components of the residual core of the particle resulting in a positive mass spectrum showing inorganic substances at low masses including iron and PAHs in a higher mass range.

13. The device according to claim 1, wherein the first beam and second beam of electromagnetic radiation from the single UV laser have a wavelength of 157 nm, so that the first beam causes SPI of the detached components, while the second beam from the same UV laser causes, substantially simultaneously, LDI of components of the residual core of the particle.

14. The device according to claim 1, wherein the first beam is deflected by the deflection mirror and the electromagnetic radiation from the single UV laser is directed by the deflection mirror towards the particle as the first beam.

15. A method for mass spectroscopic analysis of particles, the method comprising the following steps:

a) with a first irradiation unit comprising an IR laser, irradiating a particle with electromagnetic radiation to cause components of the particle to detach from the particle, the detached components of the particle being located in proximity of a residual core of the particle, b) with a second irradiation unit comprising a single UV laser, irradiating substantially simultaneously at least a part of the detached components and the residual core of the particle, with a first beam of electromagnetic radiation from the single UV laser to cause a resonance-enhanced multiphoton ionization (REMPI) or single-photon ionization (SPI) of at least a part of the detached components, the first beam of electromagnetic radiation exhibiting a first intensity, and at least a part of the residual core of the particle with a second beam of electromagnetic radiation from the single UV laser to cause a laser desorption and non-resonant ionization (LDI) of at least a part of the components of the residual core of the particle, the second beam of electromagnetic radiation exhibiting a second intensity, which is larger than the first intensity, wherein positive ions (+) and negative ions (−) of the detached components and/or of the components of the residual core are accommodated in an ion source region, wherein the second irradiation unit comprises a focusing optical element configured to generate the second beam of electromagnetic radiation by focusing at least a part of the first beam, the focusing optical element comprising i) a focusing mirror or ii) a planar mirror and a focusing lens, the first beam generated by the single UV laser impinging on both the detached components and the residual core of the particle, the second beam focused by the focusing optical element impinging only on the residual core of the particle, so that the irradiation of the detached components of the particle with the first beam and the irradiation of the residual core of same particle with the second beam occurs substantially simultaneously and both the REMPI or SPI of the detached components of the particle and the LDI of the components of the residual core of the particle is caused by electromagnetic radiation from the single UV laser directed towards the particle as the first beam and reflected by the focusing optical element back towards the particle as the second beam, wherein the single UV laser is directed towards the particle as the first beam by a deflection mirror or the single UV laser is oriented towards the particle, and c) detecting the positive ions (+) by a first detection channel and detecting the negative ions (−) by a second detection channel.

16. The method according to claim 15, wherein the detachment of the components of the particle comprises desorption, ablation, evaporation, or combinations thereof.

* * * * *